US012650147B2

(12) United States Patent
Park et al.

(10) Patent No.: US 12,650,147 B2
(45) Date of Patent: Jun. 9, 2026

(54) VEHICULAR WHEEL BEARING HAVING IMPROVED SEALING PROPERTY

(71) Applicant: ILJIN GLOBAL Co., Ltd, Seoul (KR)

(72) Inventors: Min Chul Park, Seoul (KR); Yong Won Kim, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 78 days.

(21) Appl. No.: 18/743,236

(22) Filed: Jun. 14, 2024

(65) Prior Publication Data

US 2024/0418220 A1     Dec. 19, 2024

(30) Foreign Application Priority Data

Jun. 14, 2023     (KR) ........................ 10-2023-0076259

(51) Int. Cl.
*F16C 33/78*        (2006.01)
*F16C 19/18*        (2006.01)
(52) U.S. Cl.
CPC .......... *F16C 33/7823* (2013.01); *F16C 19/18* (2013.01); *F16C 2326/02* (2013.01)
(58) Field of Classification Search
CPC ............. B60B 27/0073; F16C 2326/02; F16C 33/7876; F16C 33/7883; F16C 33/805
See application file for complete search history.

(56) References Cited

U.S. PATENT DOCUMENTS

2016/0221391 A1*   8/2016   Lim ..................... B60B 27/0073
2018/0186181 A1*   7/2018   Tada ..................... F16C 19/186
2021/0324909 A1*   10/2021   Konishi ............... F16C 33/805
2021/0372476 A1*   12/2021   Kim ................... B60B 27/0073

FOREIGN PATENT DOCUMENTS

KR            101826200 B1 *   2/2018   ............. B60B 27/00

* cited by examiner

*Primary Examiner* — John Olszewski
*Assistant Examiner* — Aimee Tran Nguyen
(74) *Attorney, Agent, or Firm* — Dinsmore & Shohl LLP; Yongsok Choi, Esq.

(57)        ABSTRACT

The vehicular wheel bearing includes a wheel hub; at least one inner ring; an outer ring; a plurality of rolling elements; an inboard-side sealing member; and an outboard-side sealing. The outboard-side sealing member includes a frame press-fitted to the outer ring and an elastic sealing part integrally attached to the frame. The frame includes a press-fitting part and a flange part bent and extending from the press-fitting part. The elastic sealing part includes a base part with which all or a part of the frame is covered, one or more of sealing lips formed to extend from the base part, an overmold part extending beyond an inner axial end portion of the press-fitting part of the frame and is mounted in close contact with an outer circumferential surface of the outer ring, and the overmold part is axially spaced apart from the press-fitting surface of the press-fitting part.

14 Claims, 7 Drawing Sheets

PRIOR ART

PRIOR ART

VEHICULAR WHEEL BEARING HAVING IMPROVED SEALING PROPERTY

CROSS-REFERENCE TO RELATED APPLICATION

This application claims priority to Korean Patent Application No. 10-2023-0076259 filed on Jun. 14, 2023, the entire contents of which are herein incorporated by reference.

TECHNICAL FIELD

The present disclosure relates to a vehicular wheel bearing for rotatably mounting and supporting a vehicular wheel to a vehicle body, and more particularly, to a vehicular wheel bearing configured to improve sealing performance by improving an overmold portion structure of a sealing member.

DESCRIPTION OF THE RELATED ART

A wheel bearing is a device used for rotatably mounting and supporting a vehicular wheel to a vehicle body, and performs a function of connecting a rotating element, to which a vehicular wheel is mounted, to a non-rotating element fixed to a vehicle body through rolling elements such that the vehicular wheel is rotatably mounted and supported to the vehicle body.

On the other hand, since wheel bearings are easily exposed to external foreign substances such as mud, moisture, or the like due to the nature of products used by being mounted to the wheels of a vehicle, the wheel bearings have a sealing member which prevents external foreign substances from entering the insides of the wheel bearings.

Referring to FIG. 1, a structure of a vehicular wheel bearing comprising a sealing member is shown exemplarily.

As shown in FIG. 1, a vehicular wheel bearing 10 may be configured so that a rotating element [for example, wheel hub 20 and inner ring 30] rotating together with a vehicular wheel is rotatably installed in a non-rotating element [for example, outer ring 40] fixed to a vehicle body through rolling elements 50, a sealing member 60 is installed between the rotating element and the non-rotating element of the wheel bearing, and thus the inflow of external foreign substances or leakage of internal grease (lubricating oil) is prevented.

Referring to FIG. 2, a structure of an outboard-side sealing member (60; open type sealing member) which may be used in a vehicular wheel bearing 10 is exemplarily shown.

As shown in FIG. 2, the sealing member (60; open type sealing member) may be configured to comprise a frame 70 which is press-fitted and mounted to the outer ring 40 and an elastic sealing part 80 integrally attached to the frame 70. In addition, sealing lips 82 provided on the elastic sealing part 80 may be configured to be in contact with or disposed adjacent to the counter member to perform sealing.

On the other hand, the elastic sealing part 80 may comprise an overmold part 84 configured to surround an end portion of the frame 70, and thus it is possible to prevent external foreign substances from entering between the press-fitting surface of the sealing member 60 and the outer ring 40 using the overmold part 84 in close contact with the outer ring 40.

Incidentally, in the sealing member 60 of this structure, the matters such as the intrusion of the overmold part 84 between the press-fitting surfaces of the frame 70 and the outer ring 40, the installation of the frame 70 in a lifted state due to the thickness of the overmold part 84, and the deterioration of the installability of the sealing member 60 due to the elastic restoring force of the overmold part 84 acting after press-fitting of the sealing member 60 may occur.

DISCLOSURE OF THE INVENTION

Technical Goals

The present disclosure is for the purpose of resolving the above-described matters with a vehicular wheel bearing, and the present disclosure is for the purpose of providing a vehicular wheel bearing configured to improve the installability and sealing performance of a sealing member by improving an overmold portion structure of the sealing member.

Technical Solutions

Representative configurations of the present disclosure to achieve the above-described purpose are as follows.

According to an example embodiment of the present disclosure, a vehicular wheel bearing for rotatably mounting and supporting a vehicular wheel to a vehicle body is provided. The vehicular wheel bearing according to an example embodiment of the present disclosure may comprise: a wheel hub to which a vehicular wheel is mounted and which rotates with the vehicular wheel; at least one inner ring mounted to the wheel hub; an outer ring mounted and fixed to a vehicle-body-side member; a plurality of rolling elements of rotatably supporting the wheel hub and the inner ring relative to the outer ring; an inboard-side sealing member which performs sealing at an axial inner end portion of a bearing space portion in which the rolling elements are located; and an outboard-side sealing member which performs sealing at an axial outer end portion of the bearing space portion in the rolling elements are located. According to an example embodiment of the present disclosure, the outboard-side sealing member may comprise a frame press-fitted to the outer ring and an elastic sealing part integrally attached to the frame. According to an example embodiment of the present disclosure, the frame may comprise a press-fitting part and a flange part bent and extending from the press-fitting part. According to an example embodiment of the present disclosure, the elastic sealing part may comprise a base part with which all or a part of the frame is covered, one or more of sealing lips formed to extend from the base part, an overmold part which extends beyond an inner axial end portion of the press-fitting part of the frame and is mounted in close contact with an outer circumferential surface of the outer ring, and the overmold part may be configured to be axially spaced apart from the press-fitting surface of the press-fitting part of the frame.

According to an example embodiment of the present disclosure, the press-fitting part of the frame may comprise a corner portion of a rounded or chamfered shape in an inner circumferential portion of the inner axial end portion, and the overmold part may be formed so that the corner portion is partially covered therewith.

According to an example embodiment of the present disclosure, the overmold part may be formed so that 25% to 75% of the corner portion is partially covered therewith.

According to an example embodiment of the present disclosure, an intersection point of the corner portion and the overmold part may be configured to be located at a distance of 0.01 mm or more in a radial direction from an installation surface to which the frame of the sealing member is press-fitted.

According to an example embodiment of the present disclosure, the overmold part may comprise a straight portion extending axially from the intersection point and an inclined portion extending from the straight portion.

According to an example embodiment of the present disclosure, the inclined portion may be formed as a straight or curved surface.

According to an example embodiment of the present disclosure, the straight portion of the overmold part may be configured to have an axial length of 0.01 mm or more.

According to an example embodiment of the present disclosure, the overmold part may comprise the rounded portion extending with a predetermined curvature from the intersection point.

According to an example embodiment of the present disclosure, the elastic sealing part may further comprise a dam portion formed to extend radially from the base part around the overmold part.

According to an example embodiment of the present disclosure, the elastic sealing part may further comprise a protruding lip formed to extend from the base part at a position axially spaced from the dam portion.

According to an example embodiment of the present disclosure, the protruding lip may be formed to extend in an inclined direction relative to an axial direction.

According to an example embodiment of the present disclosure, the one or more sealing lips may comprise one or more contact type sealing lips.

According to an example embodiment of the present disclosure, the one or more sealing lips may further comprise one or more non-contact type sealing lips.

According to an example embodiment of the present disclosure, at least one among the non-contact sealing lips may be located on a radial outer side of the contact type sealing lips and may be formed in a structure of pocket lips with an end bent radially outward.

According to an example embodiment of the present disclosure, the vehicular wheel bearing may further comprise a slinger located opposite the frame, the one or more sealing lips may be configured to be in contact with or disposed adjacent to the slinger to perform sealing.

According to an example embodiment of the present disclosure, the slinger may comprise a press-fitting part, a radial extension part bent from the press-fitting part and extending in a radial direction, and an axial extension part bent from the radial extension part and extending in an axial direction, and an axial extension part of the slinger is formed so that the axial extension part and the press-fitting part of the frame at least partially overlap in a radial direction.

In addition, the vehicular wheel bearing according to the present disclosure may further comprise other additional components to the extent that it does not impair the technical idea of the present disclosure.

Effects

A vehicular wheel bearing according to an example embodiment of the present disclosure is configured so that an overmold part of a sealing member is axially spaced from a press-fitting surface of the sealing member with a predetermined gap [for example, the overmold part is configured so that the corner portion of the frame of the sealing member is only partially covered therewith]. Accordingly, at the time of installing the sealing member, the overmold part may be elastically deformed and may flow into a space portion provided between the press-fitting surface and the overmold part. As a result, at the time of installing the seal ring member to the wheel bearing by press-fitting, it is possible to prevent the matters such as the installation of the frame in a lifted state due to the inflow of the overmold part into the press-fitting surface and the stable installation of the sealing member due to the elastic restoring force of the overmold part after installing the sealing member by press-fitting.

DETAILED DESCRIPTION

Figure 1:
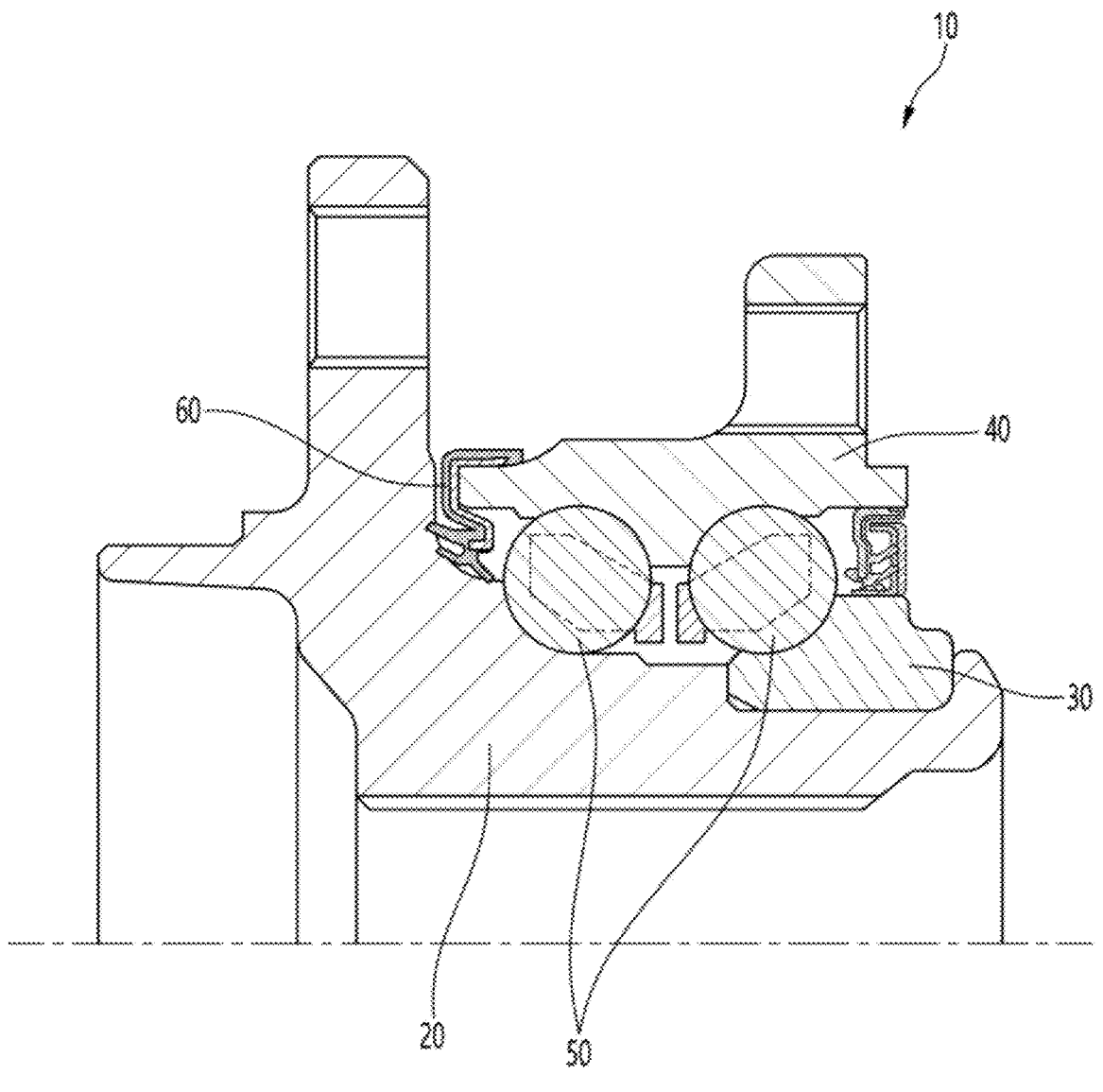
FIG. 1 exemplarily shows a structure of a vehicular wheel bearing in the related art.
Figure 2:
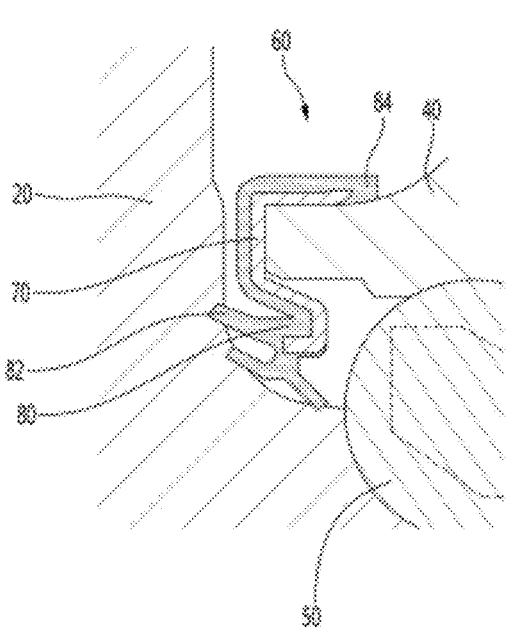
FIG. 2 exemplarily shows an example of a sealing member (outboard-side sealing member) which may be used in a vehicular wheel bearing.

Example embodiments of the present disclosure described herein are exemplified for the purpose of describing the technical spirit of the present disclosure. The scope of the claims according to the present disclosure is not limited to the example embodiments described below or to detailed descriptions of these example embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," and the like used herein should be construed as open-ended terms encompassing the possibility of including other example embodiments.

The term "axial direction" used herein may be defined as a direction extending along a rotational central axis of a wheel bearing ("axially inward" refers to the direction toward the vehicle body, and "axially outward" refers to the direction toward the wheel side). The term "radial direction" used herein may be defined as a direction perpendicular to the axial direction and away from the rotational central axis or approaching the rotational central axis. The term "circumferential direction" used herein may be defined as a direction rotating about the axial direction described above.

Unless the phrase or sentence clearly indicates otherwise, the expression "a constituent element extends in the axial direction or the radial direction" used herein should be understood as encompassing a case where the constituent element extends parallel to the axial direction or the radial direction as well as a case where the constituent element extends obliquely with respect to the axial direction or the radial direction.

The singular form described herein may include the plural form unless the context clearly dictates otherwise, and this is equally applied to the singular form set forth in the claims.

Throughout the present specification, when a constituent element is referred to as being "positioned" at or "formed" on one side of another constituent element, the constituent element may be in direct contact with or directly formed on the one side of another constituent element, or may be positioned at or formed on another constituent element by intervening yet another constituent element therebetween.

Hereinafter, example embodiments of the present disclosure will be described in detail with reference to the accompanying drawings at such an extent that they may be readily practiced by those ordinary skilled in the art. In the accompanying drawings, the same reference numerals are assigned to the same or corresponding components. Furthermore, in the following descriptions of the example embodiments, duplicate descriptions of the same or corresponding constituent elements may be omitted. However, even though a description of a constituent element is omitted, such a constituent element is not intended to be excluded in any example embodiment.

Referring to FIGS. 3 to 7, a vehicular wheel bearing according to an example embodiment of the present disclosure and a sealing member which may be applied to such a vehicular wheel bearing are exemplarily shown.

As shown in the drawing, a vehicular wheel bearing 100 according to an example embodiment of the present disclosure may be configured so that a rotating element [200; for example, wheel hub 210 and inner rings 220] is connected to a non-rotating element [for example, outer ring 300] through rolling elements 400 to rotatably support a vehicular wheel with respect to a vehicle body, similar with a conventional vehicular wheel bearing.

According to an example embodiment of the present disclosure, a wheel hub 210 which constitutes the rotating element 200 of the wheel bearing 100 may be formed in a substantially cylindrical shape extending in an axial direction, and a wheel mounting flange (hub flange) may be provided on an outer circumferential surface of the wheel hub 210. The wheel mounting flange is formed in a shape extending radially outward from the outer circumferential surface of the wheel hub 210 and may be used for mounting a wheel to the wheel hub 210 using hub bolts or the like. On the other hand, the inner ring 220 may be mounted to the vehicle-body-side end portion of the wheel hub 210 and a raceway (inner raceway) may be formed on a portion of the outer circumferential surface of the wheel hub 210 to support the rolling elements 400 from an inner side in the radial direction.

According to an example embodiment of the present disclosure, at least one the inner ring 220 may be mounted on a outer circumferential surfaces of the wheel hub 210, and a raceway (inner raceway) for the rolling elements may be formed on the outer circumferential surface of the inner ring 220 to support the rolling elements 400 from an inner side in the radial direction. For example, the inner ring 220 may be configured to be press-fitted to a seating portion provided on the vehicle-body-side end portion of the wheel hub 210 and may be configured to be supported/fixed on the wheel hub 210 with a predetermined preload applied.

According to an example embodiment of the present disclosure, the outer ring constituting the non-rotating element 300 may comprises, on an outer circumferential surface, a vehicle-body-side mounting flange using which the wheel bearing is mounted to the vehicle body. According to an example embodiment of the present disclosure, the outer ring may be configured to comprise, on an inner circumferential surface, a raceway (outer raceway) with which the rolling elements 400 is in contact. The raceway (outer raceway) formed on the inner circumferential surface of the outer ring may be configured to cooperate with the raceway (inner raceway) formed on the wheel hub 210 and/or the inner ring 220 to accommodate and support the rolling elements 400 between the raceways.

According to an example embodiment of the present disclosure, the rolling elements 400 may be disposed between the rotating element [200; for example, wheel hub 210 and inner ring 220] and the non-rotating element [for example, the outer ring 300] of the wheel bearing 100, may perform a function of rotatably supporting the rotating element 200 of the wheel bearing 100 with respect to the non-rotating element 300 of the wheel bearing 100.

However, the above-described configurations of the vehicular wheel bearing 100 according to an example embodiment of the present disclosure do not need to be limited to the structure shown in the drawings and may be modified into various structures which may be applied to vehicular wheel bearings.

For example, in the case of the example embodiment shown in the drawings, the vehicular wheel bearing 100 is configured in such a way that a raceway for supporting the rolling elements is directly formed on a part of the outer circumferential surface of the wheel hub 210. However, the vehicular wheel bearing 100 according to an example embodiment of the present disclosure may be modified and implemented in other structures, such as a structure where two inner rings 220 are mounted to the wheel hub 210 and the rolling elements 400 are supported through the two inner rings 220.

Also, in the case of the example embodiment shown in the drawing, the rolling elements 400 which rotatably support the rotating element of the wheel bearing with respect to the non-rotating element of the wheel bearing 100 are shown in the form of a spherical ball. However, the rolling elements 400 may be formed of rolling elements of other shapes such as a tapered roller.

According to an example embodiment of the present disclosure, sealing members which prevent external foreign substances from entering the bearing space portion, in which the rolling elements 400 are located, or grease (lubricating oil) filled in the bearing space portion from leaking to the outside may be provided at both ends of the vehicular wheel bearing 100.

According to an example embodiment of the present disclosure, an inboard-side sealing member 500 may be provided at the inner axial end portion of the bearing space portion in which the rolling elements 400 are located to perform sealing, and an outboard-side sealing member 600 may be provided at the outer axial end portion of the bearing space portion in which the rolling elements 400 are located to perform sealing.

According to an example embodiment of the present disclosure, the inboard-side sealing member 500 may be formed substantially the same/similar to the inboard-side sealing members used in conventional vehicular wheel bearings and the vehicular wheel bearing 100 according to an example embodiment of the present disclosure is not characterized by a specific structure of the inboard-side sealing member 500. Thus, detailed descriptions thereof will be omitted herein.

Figure 4:
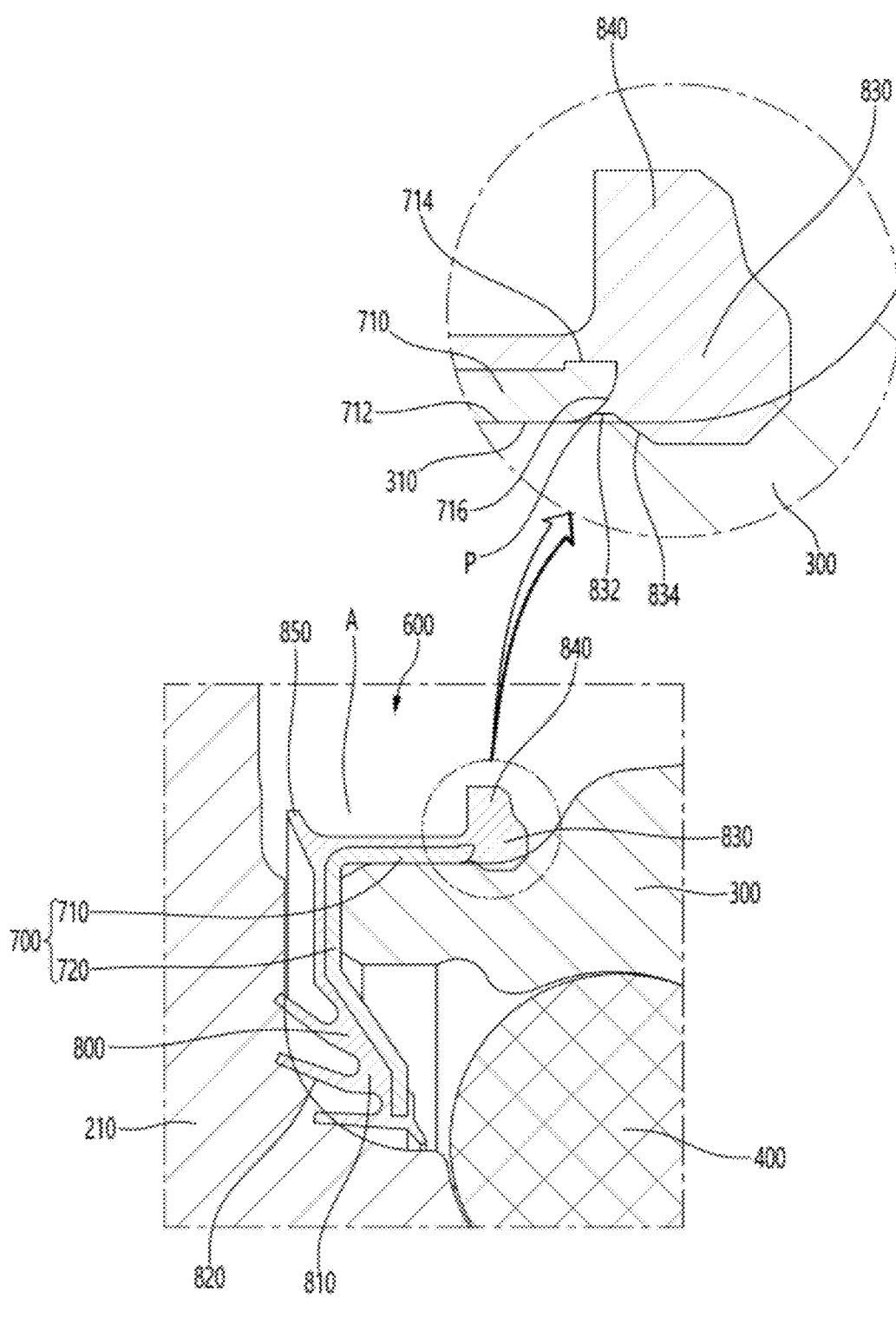
FIG. 4 exemplarily shows a sealing member (outboard-side sealing member) of the vehicular wheel bearing shown in FIG. 3.

On the other hand, referring to FIG. 4, the structure of an outboard-side sealing member (600; for example, open type sealing member) which may be used in the vehicular wheel bearing 100 according to an example embodiment of the present disclosure is exemplarily shown.

According to an example embodiment of the present disclosure, the outboard-side sealing member 600 may be configured to comprise a frame 700 press-fitted to the outer ring 300 and an elastic sealing part 800 integrally attached to the frame 700.

According to an example embodiment of the present disclosure, the frame 700 forms a basic body of the outboard-side sealing member 600 and may be formed by bending a metal plate or the like.

According to an example embodiment of the present disclosure, the frame 700 of the outboard-side sealing member 600 may be configured to comprise a press-fitting part 710 of a substantially cylindrical structure and a flange part 720 bent and extending from the press-fitting part 710.

According to an example embodiment of the present disclosure, the press-fitting part 710 of the frame 700 may be configured to be press-fitted to the outer circumferential surface of the outer ring 300 as shown in the drawing. In addition, a part of the flange part 720 of the frame 700 may be configured to be in contact with the outer axial end surface of the outer ring 300.

According to an example embodiment of the present disclosure, the elastic sealing part 800 of the sealing member 600 may be formed of an elastic material such as rubber and may be configured to be integrally attached to the frame 700 through a method such as vulcanization molding.

According to an example embodiment of the present disclosure, the elastic sealing part 800 may be configured to comprise a base part 810 which surrounds all or a part of the frame 700, one or more sealing lips 820 extending from the base part 810, and an overmold part 830 which extends beyond an inner axial end portion 714 of the press-fitting part 710 of the frame 700 and is mounted in close contact with the outer circumferential surface of the outer ring 300.

According to an example embodiment of the present disclosure, as shown in the drawing, the base part 810 of the elastic sealing part 800 may be configured to extend from the radial inner end portion to the outer end portion of the frame 600 so that the axial outer end surface and the radial outer end surface of the frame 600 are entirely covered therewith.

According to an example embodiment of the present disclosure, the sealing lips 820 of the elastic sealing part 800 may be configured so that the end portion thereof is in contact with or is disposed adjacent to a counterpart member [in the case of the example embodiment shown in the drawing, the wheel hub 210 or a slinger 900 mounted to the wheel hub 210] to perform sealing.

According to an example embodiment of the present disclosure, the sealing lips 820 may be implemented as contact type sealing lips which perform contact type sealing by bringing them into contact with a counterpart member, non-contact sealing lips which are disposed adjacent to a counterpart member and perform sealing in a non-contact manner, and a combination of contact type sealing lips and non-contact sealing lips.

Figure 3:
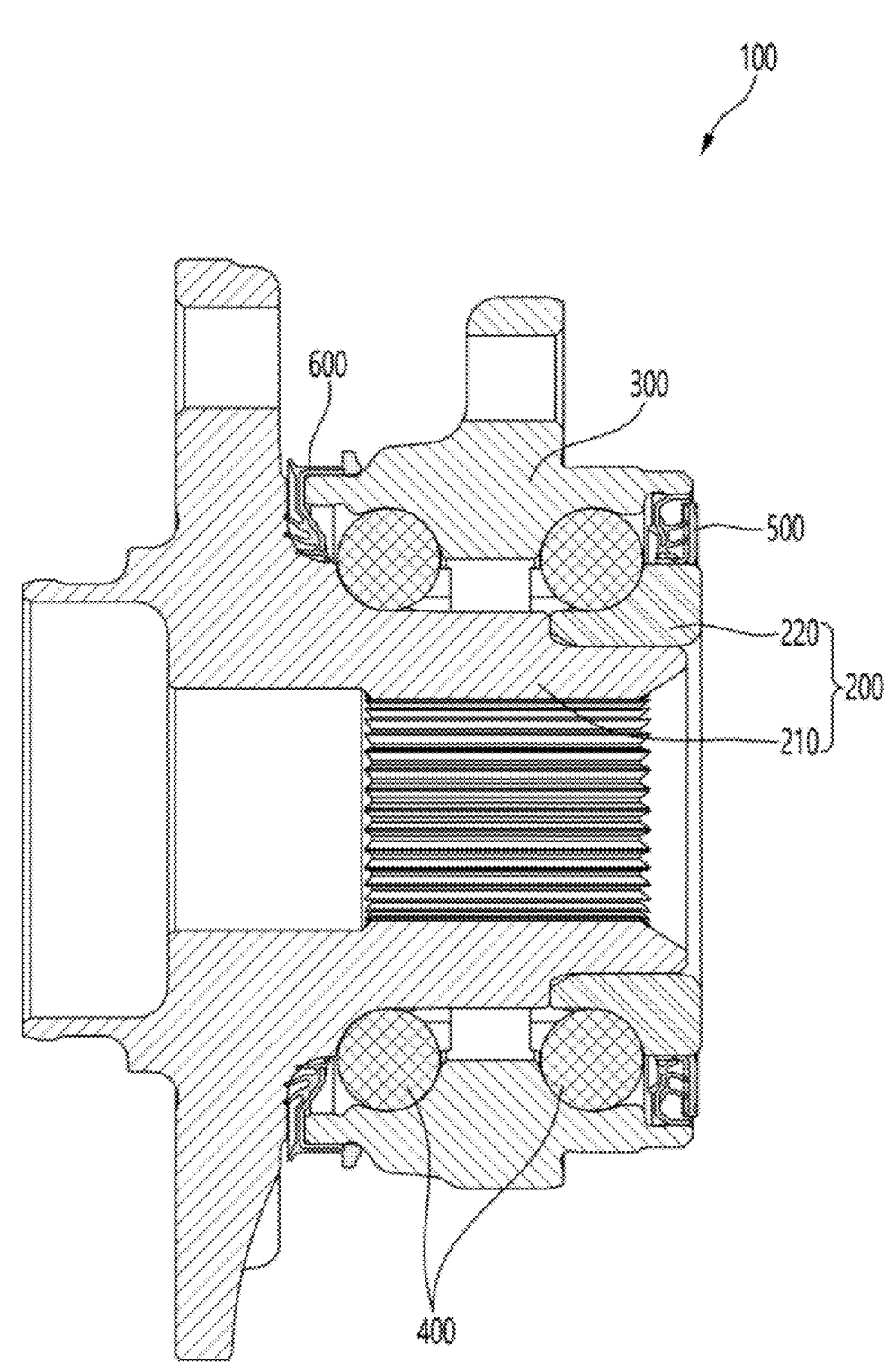
FIG. 3 exemplarily shows a structure of a vehicular wheel bearing according to an example embodiment of the present disclosure.
Figure 5:
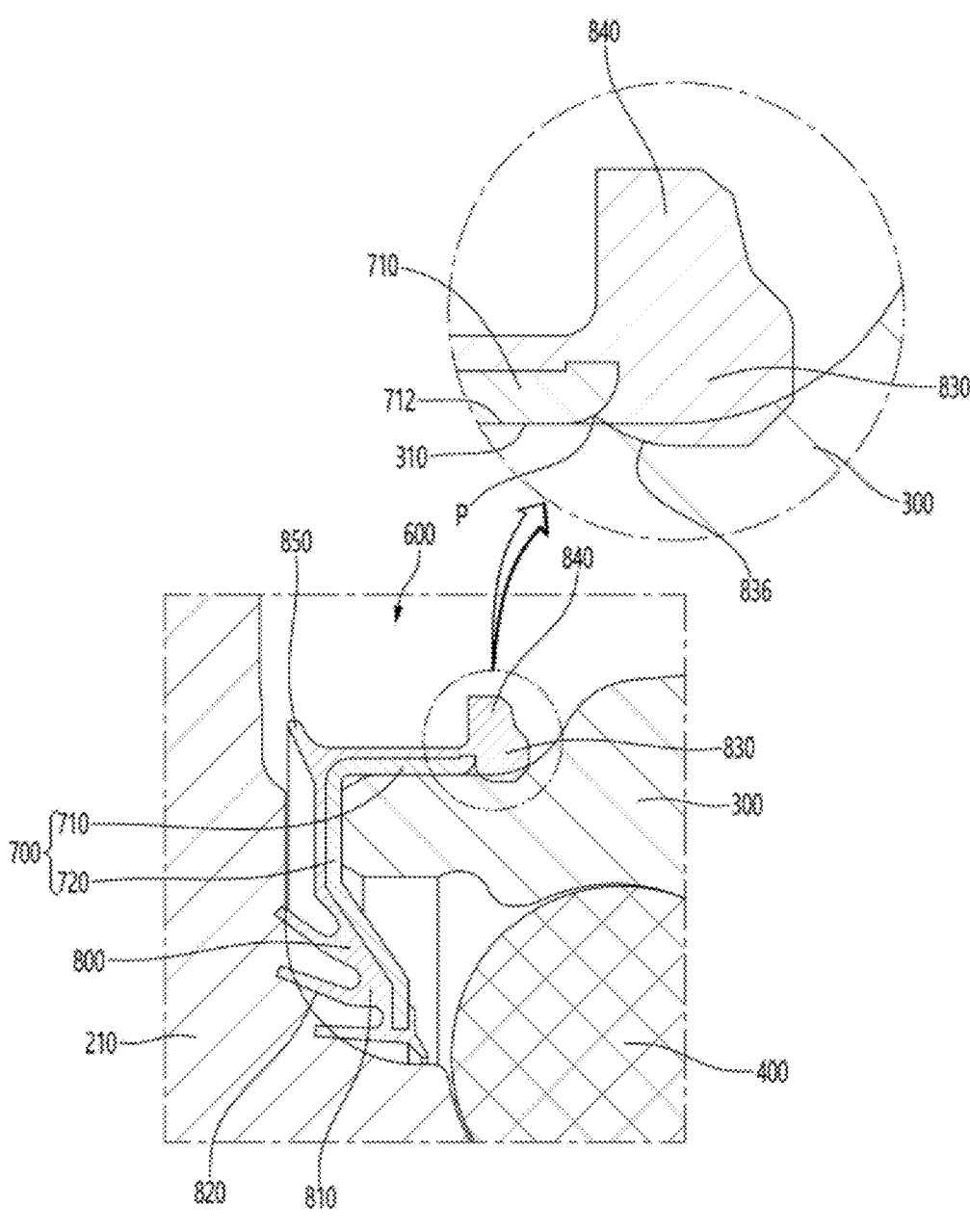
FIGS. 5 to 7 exemplarily show modified examples of a sealing member (outboard-side sealing member) shown in FIGS. 3 and 4.

For example, in the example embodiment shown in FIGS. 3 to 5, the sealing lips 820 are composed of contact type sealing lips. In addition, in the example embodiment shown in FIGS. 6 and 7, the sealing lips 820 are formed as a combination of contact type sealing lips and non-contact sealing lips.

According to an example embodiment of the present disclosure, non-contact sealing lips may be configured to be located radially outside of the contact type sealing lips. In addition, one or more of the non-contact sealing lips may be formed as pocket lips 822 with ends bent radially outward. (refer to example embodiments shown in FIGS. 6 and 7)

According to an example embodiment of the present disclosure, the overmold part 830 of the elastic sealing part 800 may be configured to partially surround the end portion of the frame 700, and the overmold part 830 which is made of an elastic material allows the sealing member 600 to be installed in stable close contact with the outer ring 300.

According to an example embodiment of the present disclosure, the overmold part 830 may be configured to be spaced apart in the axial direction to have a predetermined gap with the press-fitting surface 712 formed on the inner circumferential surface of the press-fitting part 710 of the frame 700.

According to an example embodiment of the present disclosure, the press-fitting part 710 of the frame 700 may be configured to comprise a rounded or chamfered corner portion 716 in the inner circumferential portion of the inner axial end portion 714, and the overmold part 830 may be formed so that the corner portion 716 is partially covered therewith.

That is to say, the corner portion 716 is not configured to be entirely covered with the overmold part 830. As shown in the drawing, a portion of the corner portion 716 is covered with the overmold part 830 and the other portion of the corner portion 716 is not to be covered with the overmold part 830.

According to an example embodiment of the present disclosure, the overmold part 830 may be formed so that 25% to 75% of the corner portion 716 described above is partially covered therewith.

According to an example embodiment of the present disclosure, the starting point [intersection point P between the overmold part 830 and the corner portion 716] of the overmold part 830 may be configured to be located at a distance of 0.01 mm or more in the radial direction from an installation surface 310 to which the press-fitting part 710 of the frame 700 is press-fitted.

According to an example embodiment of the present disclosure, the overmold part 830 may be configured to comprise a straight portion 832 extending axially from the starting point [intersection point P between the overmold part 830 and the corner portion 716] of the overmold part 830 and an inclined portion 834 extending from the straight portion 832.

According to an example embodiment of the present disclosure, the straight portion 832 may be formed as a substantially cylindrical surface extending in a direction parallel to the axial direction and the inclined portion 834 may be formed as a substantially conical surface extending in an inclined direction with respect to the axial direction.

Here, the straight portion 832 and the inclined portion 834 of the overmold part 830 do not necessarily need to be formed in a straight shape as shown in the drawing, but may be also formed as other shapes such as a curved shape.

According to an example embodiment of the present disclosure, instead of the overmold part 830 being formed as a structure comprising the straight portion 832 and the inclined portion 834 as shown in FIG. 4, the overmold part 830 may be formed as a modified structure which comprises a rounded portion 836 extending at a predetermined curvature from the intersection point P with the corner portion 716, as shown in FIG. 5.

According to an example embodiment of the present disclosure, the elastic sealing part 800 of the sealing member 600 may further comprise a dam portion 840 formed around the overmold part 830 and extending radially from the base part 810.

In this way, when the dam portion 840 is formed radially protruding around the overmold part 830, external foreign substances may be prevented from moving toward the press-fitting part of the sealing member 600 due to the dam portion 840, and as a result, it is possible to further improve the sealing performance of the sealing member 600.

According to an example embodiment of the present disclosure, the elastic sealing part 800 of the sealing member 600 may further comprise a protruding lip 850 extending from the base part 810 at a position axially spaced from the dam portion 840.

According to an example embodiment of the present disclosure, the protruding lip 850 provided in the elastic sealing part 800 may be configured to extend in an inclined direction with respect to the axial direction as shown in the drawing and may be configured to have an end portion disposed adjacent to the wheel hub 210 [specifically, adjacent to the wheel mounting flange of the wheel hub 210] to perform sealing.

According to this structure, an accommodating space in which foreign substances may be accommodated may be formed on the outer circumferential surface of the elastic sealing part 800 using the dam portion 840 and the protruding lip 850. Thus, it is possible to further improve the sealing performance of the sealing member 600.

According to an example embodiment of the present disclosure, the sealing member 600 may be configured to perform sealing between the sealing lips 820 and the wheel hub 210 by bringing it into contact with or being disposed adjacent to the wheel hub 210, as shown in FIGS. 3 to 5. In addition, as shown in FIGS. 6 and 7, the sealing lips 820 may be configured so that it is in contact with or disposed adjacent to the slinger 900 mounted to the wheel hub 210 to perform sealing between the slinger 900 and the slinger 900.

Figure 6:
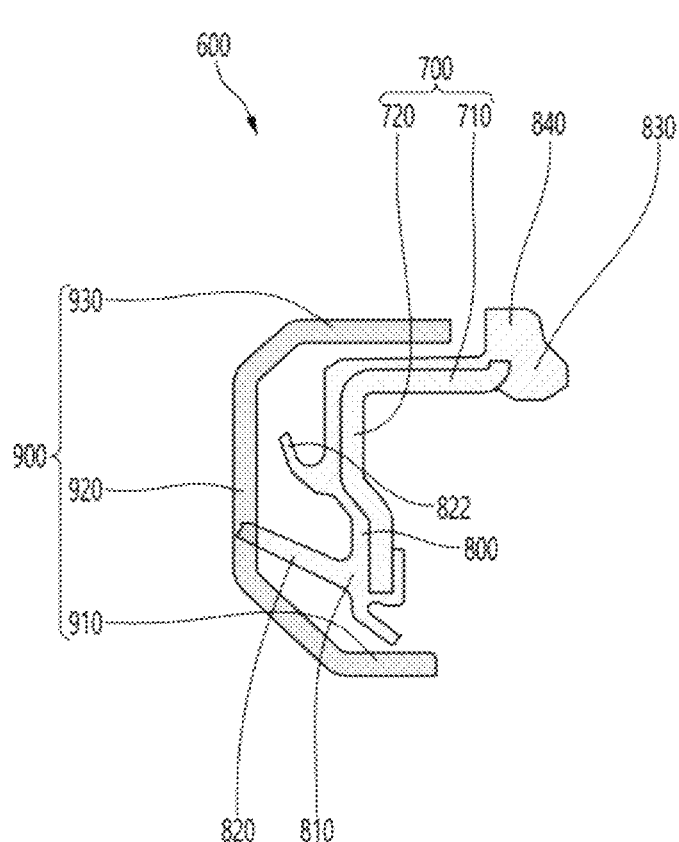
Figure 7:
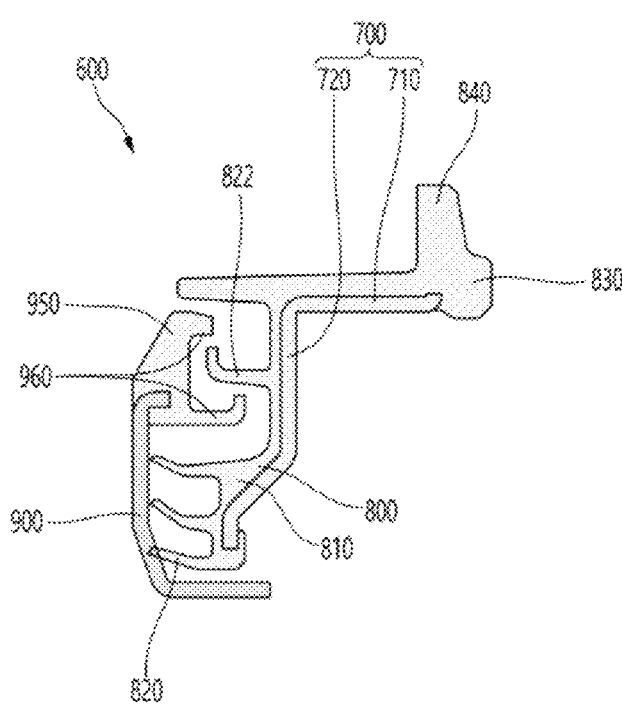

According to an example embodiment of the present disclosure, as shown in FIG. 6, the slinger 900 may be configured to comprise a press-fitting part 910 press-fitted into the outer circumferential surface of the wheel hub 210, a radial extension part 920 which is bent from the press-fitting part 910 and extends in the radial direction, an axial extension part 930 which is bent from the radial extension part 920 and extends in the axial direction, and the like.

According to an example embodiment of the present disclosure, all or a part of the sealing lips 820 may be configured so that it is in contact with or disposed adjacent to the press-fitting part 910 and/or the radial extension part 920 of the slinger 900 to perform sealing. In addition, the axial extension part 930 of the slinger 900 may be configured so that the end portion thereof is disposed adjacent to the dam portion 840 of the elastic sealing part 800 and the axial extension part 930 and the press-fitting part 710 of the frame 700 at least partially overlaps in the radial direction.

According to this structure, a labyrinth structure having a narrow gap may be formed between the axial extension part 930 and the dam portion 840 of the slinger 900 and/or between the axial extension part 930 of the slinger 900 and the press-fitting part 710 of the frame 700. Thus, it is possible to further improve the sealing performance of the sealing member 600.

According to an example embodiment of the present disclosure, as shown in FIG. 7, the sealing member 600 may be configured to comprise an elastic sealing part 950 in the slinger 900, as well as the frame 700.

According to an example embodiment of the present disclosure, the elastic sealing part 950 provided in the slinger 900 may be configured to comprise one or more sealing lips 960 extending toward the frame 700, as shown in the drawing. In addition, the sealing lips 960 of the elastic sealing part 950 attached to the slinger 900 may be configured to be disposed to intersect in the radial direction with the sealing lips of the elastic sealing part 800 attached to the frame 700 to more reliably prevent the inflow of external foreign substances.

Although the present disclosure has been explained above by specific details such as specific components and limited examples, these examples are provided only to facilitate a more general understanding of the present disclosure, and the present disclosure is not limited to this. In addition, anyone with ordinary knowledge in the technical field to which the present disclosure pertains can make various modifications and changes from this description.

Therefore, the idea of the present disclosure should not be limited to the embodiments described above, and the claims described later as well as all equivalent or equivalent modifications to this claim are included in the scope of the idea of the present disclosure. It will be said that it belongs.

EXPLANATION OF REFERENCE NUMERALS

100: Vehicular wheel bearing
200: Rotating element
210: Wheel hub
220: Inner ring
300: Outer ring (Non-rotating element)
400: Rolling element
500: Inboard-side sealing member
600: Outboard-side sealing member
700: Frame
800: Elastic sealing part
810: Base part
820: Sealing lip
830: Overmold part
840: Dam portion
850: Protruding lip
900: Slinger

What is claimed is:

1. A vehicular wheel bearing (100) for rotatably mounting and supporting a vehicular wheel to a vehicle body, the vehicular wheel bearing comprising:
   a wheel hub (210) to which the vehicular wheel is mounted and which rotates with the vehicular wheel;
   at least one inner ring (220) mounted to the wheel hub (210);
   an outer ring (300) mounted and fixed to a vehicle-body-side member;
   a plurality of rolling elements (400) of rotatably supporting the wheel hub (210) and the inner ring (220) relative to the outer ring (300);
   an inboard-side sealing member (500) which performs sealing at an axial inner end portion of a bearing space portion in which the rolling elements (400) are located; and
   an outboard-side sealing member (600) which performs sealing at an axial outer end portion of the bearing space portion in the rolling elements (400) are located,
   wherein the outboard-side sealing member (600) comprises a frame (700) press-fitted to the outer ring (300) and an elastic sealing part (800) integrally attached to the frame (700), the frame (700) comprises a press-fitting part (710) and a flange part (720) bent and extending from the press-fitting part (710), the elastic sealing part (800) comprises a base part (810) with which all or a part of the frame (700) is covered, one or more of sealing lips (820) formed to extend from the base part (810), an overmold part (830) which extends beyond an inner axial end portion (714) of the press-fitting part (710) of the frame (700) and is mounted in close contact with an outer circumferential surface of the outer ring (300), and the overmold part (830) is configured to be axially spaced apart from a press-fitting surface (712) of the press-fitting part (710) of the frame (700), wherein the press-fitting part (710) of the frame (700) comprises a corner portion (716) of a rounded or chamfered shape in an inner circumferential portion of the inner axial end portion (714), and the overmold part (830) is formed so that the corner portion (716) is partially covered therewith, and wherein an intersection point P of the corner portion (716) and the overmold part (830) is configured to be located at a distance of 0.01 mm or more in a radial direction from an installation surface (310) to which the frame (700) of the sealing member (600) is press-fitted.

2. The vehicular wheel bearing of claim 1, wherein the overmold part (830) is formed so that 25% to 75% of the corner portion (716) is partially covered therewith.

3. The vehicular wheel bearing of claim 1, wherein the overmold part 830 comprises a straight portion (832) extending axially from an intersection point P and an inclined portion (834) extending from the straight portion (832).

4. The vehicular wheel bearing of claim 3, wherein the inclined portion (834) is formed as a straight or curved surface.

5. The vehicular wheel bearing of claim 3, wherein the straight portion (832) of the overmold part (830) is configured to have an axial length of 0.01 mm or more.

6. The vehicular wheel bearing for a vehicle of claim 1, wherein the overmold part (830) comprises a rounded portion (836) extending with a predetermined curvature from an intersection point P.

7. The vehicular wheel bearing for a vehicle of claim 1, wherein the elastic sealing part (800) further comprises a dam portion (840) formed to extend radially from the base part (810) around the overmold part (830).

8. The vehicular wheel bearing for a vehicle of claim 7, wherein the elastic sealing part (800) further comprises a protruding lip (850) formed to extend from the base part (810) at a position axially spaced from the dam portion (840).

9. The vehicular wheel bearing for a vehicle of claim 8, wherein the protruding lip (850) is formed to extend in an inclined direction relative to an axial direction.

10. The vehicular wheel bearing for a vehicle of claim 9, wherein the one or more sealing lips (820) comprise one or more contact type sealing lips.

11. The vehicular wheel bearing of claim 10, wherein the one or more sealing lips (820) further comprise one or more non-contact type sealing lips.

12. The vehicular wheel bearing of claim 11, wherein at least one of non-contact sealing lips is located on a radial outer side of the contact type sealing lips and is formed in a structure of pocket lips (822) with an end bent radially outward.

13. The vehicular wheel bearing of claim 1, further comprising:

a slinger (900) located opposite the frame (700), wherein the one or more sealing lips (820) are configured to be in contact with or disposed adjacent to the slinger (900) to perform sealing.

14. The vehicular wheel bearing of claim 13, wherein the slinger (900) comprises a press-fitting part (910), a radial extension part (920) bent from the press-fitting part (910) and extending in a radial direction, and an axial extension part (930) bent from the radial extension part (920) and extending in an axial direction, and an axial extension part (930) of the slinger (900) is formed so that the axial extension part (930) and the press-fitting part (710) of the frame (700) at least partially overlap in a radial direction.

* * * * *